United States Patent [19]

Pavel

[11] Patent Number: 5,595,651
[45] Date of Patent: Jan. 21, 1997

[54] ALL-PLASTIC HAND-ASSEMBLED SUPER-STRENGTH REVERSE OSMOSIS MEMBRANE HOUSING

[76] Inventor: Augustin Pavel, 301 Industrial Way Suite 2-3, Fallbrook, Calif. 92028

[21] Appl. No.: 390,294

[22] Filed: Jan. 23, 1995

[51] Int. Cl.[6] .................................................. B01D 61/08
[52] U.S. Cl. ...................... 210/232; 210/321.87; 210/450
[58] Field of Search .............................. 210/232, 321.83, 210/450, 321.8, 321.87

[56] References Cited

U.S. PATENT DOCUMENTS

| | | | |
|---|---|---|---|
| 4,219,426 | 8/1980 | Spekle et al. | 210/232 |
| 4,600,512 | 7/1986 | Aid | 210/321.83 |
| 4,781,830 | 11/1988 | Olsen | 210/232 |

*Primary Examiner*—Frank Spear
*Attorney, Agent, or Firm*—William C. Fuess

[57] ABSTRACT

A cylindrical central high-strength pipe, normally a custom extrusion of PVC, mounts caps, preferably of high-strength Rhinite™ plastic, at both ends so as to create an interior reservoir that is capable of being pressurized to a working pressure of 230 P.S.I. and a burst pressure in excess of 600 P.S.I. Each end cap, permanently affixed to the pipe end by gluing, includes a cylindrical outer sleeve extending beyond the pipe end and presenting in its extension a circular interior groove. A circular plug, again preferably made from Rhinite™ plastic, is inserted into the sleeve extension to form a pressure tight seal against a circular gasket, preferably a robust one eight inch (⅛") thickness "O"-ring. A retaining ring, preferably made of Delrin™ plastic, that is expandable and contractible in circumference is inserted in the circular interior grove of the sleeve and against the plug, therein to make that the reservoir is capable of being pressurized. Complimentary beveled surfaces on the plug and the retaining ring serve to forcibly hold both in position against pressure forces within the reservoir.

8 Claims, 2 Drawing Sheets

ALL-PLASTIC HAND-ASSEMBLED SUPER-STRENGTH REVERSE OSMOSIS MEMBRANE HOUSING

BACKGROUND OF THE INVENTION

1. Field of the Invention

The present invention generally concerns reverse osmosis water purification systems, and especially the housing for an reverse osmosis membrane used in a reverse osmosis water purification system.

The present invention particularly concerns the design of an all-plastic housing for a reverse osmosis membrane used in a reverse osmosis water purification system, and a method of constructing such a housing, so that, nonetheless that the constructed housing is easy and quick to assemble about an enclosed membrane by hand and totally without tools, the housing exhibits great strength and reliability.

2. Description of the Prior Art

2.1 General Construction of Housings for Reverse Osmosis Membranes, or Membrane Housings Housings for reverse osmosis membranes, or membrane housings, are commonly made of various combinations of three materials. Each material used must be essentially inert to, and uncorrupted or corroded by, the liquids with which it comes into contact during the reverse osmosis process. Because the liquids at the exterior of the membrane within the housing are, in accordance with the principles of reverse osmosis, necessarily at a considerable pressure, the material of the housing must have considerable structural strength.

Stainless steel is commonly used for the highest pressure applications, typically for pressures in the range over eight hundred pounds per square inch (>800 lbs./inch$^2$), and typically less than one thousand pounds per square inch (<1000 lbs./inch$^2$) Filament wound fiberglass may also be used for the same high pressures. Finally, thermoplastic, and most commonly polyvinyl chloride, or PVC, is used for low osmotic pressures up to approximately two hundred pounds per square inch (<200 lbs./inch$^2$).

An osmosis membrane is commonly shaped as an elongate cylinder, and so also is the shape of the housing holding the cylindrical membrane. Low pressure membranes are commonly available in sizes 4"×14", 4"×21", 4"×40", and 2 @ 4"×40" where 4" is the outside diameter and the 14", 21", or 40" is the length. The inside diameter, or bore diameter, of the osmosis membrane is commonly about one-half inch (½"), terminating at both ends of the bore in a short, three-quarter inch (¾") pipe stub. The principle of the use of the osmotic membrane is that an unpurified and pressurized inlet fluid is fed into the membrane along its one end while a concentrate fluid is withdrawn from the exterior surface of the membrane at the opposite end. Such portion of the pressurized fluid as penetrates through the membrane to its central bore exhibits a greatly reduced pressure, and is drawn off from either, or both, ends of this central bore as the purified, or product, fluid.

The housing that fits about the osmotic membrane accordingly has, for a one common type of membranes, an interior diameter of four inches (4"). The housing is of a length suits the enclosure of the full length of the membranes, which are commonly of lengths 14", 21" or 40". A housing will sometimes enclose two membranes such as, for example, 2 @ 4"×40".

2.1 Problems With the Construction and Use of Membrane Housings

Membrane housings must have removable end sections, or caps, in order that access may be obtained to the contained filter for filter replacement. The opening to the filter must be of a diameter as great as is the filter itself, or commonly 4". When the housing and its contained filter are in use in a reverse osmosis system, the fluid inside the housing is pressurized, commonly at up to two hundred and thirty pounds per square inch (230 P.S.I.). The force exerted by this pressure against a circular plug of four inch outside diameter (4" O.D.) and approximately twenty-five square inches (25 in$^2$) area is on the order of five thousand seven hundred and fifty pounds (5,750 lbs.), or two and seven-eighths tons (2.875 tons) of force.

One common construction of and end plug, or cap, is applied to a reverse osmosis membrane housing that has, as its central structural element, a thick and robust custom-extrusion cylindrical pipe, commonly of PVC. The PVC pipe is commonly of four inch internal diameter (4" I.D.) with a twenty-six hundredths inch (0.26") wall thickness. A circular plug of four inches outside diameter (4" O.D.) and a typical thickness of one inch (1") is retained within the pipe at a position typically one and one-half inches (1½") from the end of the pipe. The circular plug is typically so maintained by removable pins or dowels, typically two in number made from quarter inch (¼") stainless steel rod, that extend through opposing (¼") holes in the wall of the pipe and transversely across the (4") bore of the pipe. The two transverse pins are typically spaced parallel at a separation from each other of two and one-quarter inches (2 ¼"), and are spaced each one at about one-half inch (½") maximum separation from that interior sidewall of the pipe to which it is most closely adjacent.

The one inch (1") thick circular plug presents circumferential channels or grooves—typically two in number—in which are typically placed neoprene rubber "O" rings to serve as sealing gaskets. Fluid flow access to the filter within the pipe, and the housing, is through ports in the cap. A first port in the cap is typically located midway between the center and the rim, and permits fluid flow access to the filter for purposes (as the connection dictates) of either (i) unpurified input or (ii) concentrate output. An optional second port in the cap is centrally located and serves, when opened, to permit flow communication with the axial bore of the filter for the purpose of retrieving the purified, product, output fluid.

There are several problems presented with this construction. This first, and most dire, problem is that the entire assembly is prone to catastrophic failure in use, hazarding the severe flooding of the premises in which a reverse osmosis system is installed. Because the four holes in the sidewall of the PVC pipe into which the stainless steel pins are inserted serve to weaken the pipe at this location, an exterior surround band, also typically of stainless steel, is use to surround the pipe and to also engage the ends of the stainless steel retaining pins. No substantial redistribution of the high local specific forces at the four pin holes may be accomplished unless, and until, the surround band is affixed to the circumference of the pipe. The surround band is so typically affixed by glue and/or by its complimentary fit into a shallow exterior circumferential groove to the pipe. Because the location of the (i) four pin holes, or (ii) the shallow exterior circumferential groove, are the structurally weakest points of the PVC pipe, the pipe typically fails by completely rupturing into two separate pieces at a one of these locations.

Another problem is presented with accessibility to the filter. The stainless steel pins are prone to contamination, and must typically be driven from their seated positions (holding in the end plug, and filter) by use of a hammer and drift punch, often in tight quarters. Reinsertion of the stainless steel retaining pins is equally cumbersome, and normally requires effort to align the pins into their transverse holes, and hammering.

Still another problem is presented with the location of the "O" ring seals to the rim of the circular plug. Although the pressure against these rings permits fluid-tight sealing, it is clear that the "O"-rings are, as seated within their invariant channels or grooves at the rim of the plug, not in compression between any two complimentary surfaces, but only as between one surface (a side of the channel, or groove, at the rim of the plug) an the pressurized fluid itself. This is an awkward use of a seal, or gasket, best and most reliably used in compression between two solid surfaces of complimentary contour. This awkwardness may be why manufacturers of prior art osmosis membrane housings often advertise and promote "double seals", meaning two "O" rings per sealed channel per plug. Logically, if a seal was properly deployed then one such should suffice. (The present invention will prove to have redundant, dual, seals in one location only, which location is not equivalent to the location now discussed. The use of redundant, or dual, seals in the preferred embodiment of the present invention may considered to be as much for market acceptance, and user emotional comfort, as for any practical utility or necessity.)

A third problem is presented with the location of the flow connections at the plug which is seated well below the end of the pipe. It will be recalled that there is an inlet flow connection at one end of the housing for channeling unpurified, inlet, fluid into contact with the exterior surface of the osmosis membrane at a one end thereof. Likewise, there is a first outlet flow connection at the other end of the housing for channeling the waste, concentrate, fluid away from the osmosis membrane at its other end. Finally, there is a second outlet flow connection at one, or at both, ends of the membrane's central bore by which connection(s) the purified, product, fluid is extracted. In the prior art all these flow connections are through the plugs at each end. Logically, and in actual real-world use, less cumbersome movement of plumbing connecting to the housing would be required if at least some of the flow connections were to, and through, the cylindrical sidewalls of the housing as opposed to being through its end plugs.

The present invention will be seen to be generally concerned with an entire re-engineering of a reverse osmosis membrane housing so that (i) an housing constructed entirely of plastic is (ii) easy and quick to assemble about an enclosed membrane by hand and totally without tools, while (iii) exhibiting great strength and reliability. The (iv) locations at which the external, plumbed, fluid flow lines are connected to the housing are also slightly changed, generally improving thereby ease of access to the housing and its contained osmosis filter.

SUMMARY OF THE INVENTION

The present invention contemplates an all-plastic housing for the reverse osmosis membrane within a reverse osmosis system where, nonetheless to being completely assembled by hand and without tools, the housing reliably achieves and maintains a great burst strength that is commonly in excess of six hundred pounds per square inch (600 P.S.I.).

The present invention further contemplates a plastic retaining ring for the plug end of a housing for a reverse osmosis membrane. This retaining ring, nonetheless to being removable by the fingers from an un-pressurized membrane housing, is shaped and contoured so as to, when mated with a complimentary feature on the housing, securely retain a plug end of a typical diameter of four inches (4") and a typical area of twenty five square inches (25 inches$^2$) against a pressure force of up to six hundred pounds per square inch (600 P.S.I.), or a total of about seven and one-half tons (7.5 tons) of force.

The present invention constitutes an improvement to a membrane housing having a cylindrical central pipe and caps to the pipe ends so as to create a reservoir that is capable of being pressurized within the interior of the pipe. The pipe is conventional polyvinyl chloride, typically four inches (4") in diameter having a typical burst strength of seven hundred pounds per square inch (700 P.S.I.).

In accordance with the present invention at least one, and preferably both, of the end caps includes a cylindrical outer sleeve that is permanently affixed to a pipe end and that extends beyond the pipe end. The sleeve presents in its extension a circular interior groove. The sleeve is robustly constructed, and is preferably made of Rhinite™ plastic (Rhinite™ is a trademark of E. I. DuPont de Nemours and Company) which has a burst strength of 23,000 P.S.I., or about four times (×4) that of ABS plastic. The sleeve is preferably affixed to the pipe by gluing, and more preferably by gluing with two-part polyurethane resin adhesive UR3503 available from the HP Fuller Company.

A circular gasket, preferably a robust two hundred and ten thousandths inch outside diameter (0.210" O.D.) "O"-ring, is located within the cylindrical sleeve;

A circular plug, again preferably made from Rhinite™ plastic, is inserted into the sleeve extension to form a pressure tight seal against the gasket.

Although this construction, and these preferred materials, are about twice as expensive (circa 1994) as are the ABS plastic end caps of the prior art, the stage is now set for realizing the essential advantage of the present invention. Namely, the plug will be removeably sealed in the sleeve, rendering pressure tight the reservoir within the pipe—and reliably so at a considerable, 300%, margin of safety —by the use only of plastic, and totally without any metal(s) whatsoever.

In accordance with the present invention, a retaining ring made of plastic is inserted in the circular interior grove of the sleeve and against the plug in a position of such plug outboard of the reservoir. The retaining ring holds the plug in the sleeve, therein to make that the reservoir is capable of being pressurized.

If the reservoir is pressurized to the high limit of the its normal 150–200 P.S.I. working range, and if the diameter of the plug is, as is common, four inches (4") with a plug area of twenty-five square inches (25 inches$^2$), then the pressure against this retaining ring is a considerable five thousand pounds (5000 lbs.), or two and one-half tons (2½ tons). In actuality, the safety margin of the membrane housing is 300%, and pressures up to 600—P.S.I producing forces on the retaining ring in excess of seven and one-half tons (7½ tons)—may be routinely and reliably contained.

In order to do so, the retaining ring is preferably constructed of Delrin™ plastic (Delrin™ is a trademark of E. I. DuPont de Nemours and Company), which is immensely strong and essentially shatterproof. Notably, this retaining ring is circular and fits within a circular interior grove of the sleeve, thereby effectively distributing force throughout a full 360° of the circumference of the sleeve (which, it will be remembered, is of robust construction).

Furthermore, the circular plug preferably has and presents at its circular periphery opposite to the seal a bevel surface.

The plastic retaining ring is of complimentary contour, and seats upon this bevel surface of the circular plug in a manner that tends, when a pressure force is exerted on the plug such as would tend to eject the plug from the sleeve, to force the plastic retaining ring to greater circumferential distension, and into the circular interior grove of the sleeve into which the plastic retaining ring fits. Ergo, the pressure in the reservoir tends to hold the plastic retaining ring in its place within the groove. This important feature makes not only that the retaining ring is held securely in place, but that some of the tremendous forces between the retaining ring and the sleeve are in compression of the retaining ring, and not in shear. Moreover, the retaining ring is held so tightly in place that, nonetheless to being manually removable with the fingers when then membrane housing is un-pressurized, that it cannot be removed once, and when, the membrane housing is pressurized (commonly to 150–200P.S.I.).

Still further, the plastic retaining ring seated upon the bevel surface preferably has and presents a cylindrical flange that extends in parallel with the cylindrical interior surface of the cylindrical sleeve. This flange still further tends to stabilize the plastic retaining ring in its place within the groove.

The plastic retaining ring has and presents a small opening by which the ring may be foreshortened in diameter and circumference so as to facilitate insertion into and extraction from the groove. A feature that is suitable to be manually grasped by the fingers in order that the retaining ring may be extracted from the grove is located at the opening. The feature is typically in the form of a small tab oriented towards the interior of the plastic retaining ring.

As a further, separate, feature of the present invention, a single type of circular plug may be used at both ends of the membrane housing. One end of the membrane housing normally presents to flow connections: a product outlet and an inlet. Meanwhile, the other end of the membrane housing normally has but a single flow connections: a concentrate outlet. According to these different configurations, the preferred circular plug has and presents a central bore that is occluded by an integral stop in the form of a wall across the bore. This stop in the form of the wall may be left intact, sealing closed the bore. Alternatively, it may be drilled out of the bore, the bore tapped, and a pressurized plumbed fluid flow connection made to the reservoir through the central bore of the circular plug.

These and other aspects and attributes of the present invention will become increasingly clear upon reference to the following drawings and accompanying specification.

DESCRIPTION OF THE PREFERRED EMBODIMENT

The present invention is embodied in an all-plastic hand-assembled super-strength reverse osmosis membrane housing. The housing is cylindrical in shape. Its unique structure requires no tools to assemble. The housing has and presents standard ½" NPT ports for each of (i) inlet, or feed, liquid (normally water), and (ii) output concentrate, both of which ports are conveniently located to the sides of the housing. A (iii) product outlet port, also presenting a standard ½ "NPT fitting, is located along the central axis of the housing, and is normally open at one end only. The assembly and connection aspects of the housing cause that installation and service time is minimal, promoting economy.

The housing has and defines a feed water mixing chamber. It has double seals in its flow connections to the product fluid conduit, called the product adapters, of the contained reverse osmosis filter. These aspects of the housing are indicative of a quality, full-featured, design.

The cylindrical core of the housing is ruggedly constructed of PVC material complying with ASTM-D1784. Two end caps, exclusive of a retaining ring in each, are constructed of Rhinite™ plastic (Rhinite™ is a trademark of E. I. DuPont de Nemours and Company). Rhinite™ plastic has a burst strength of 23,000 P.S.I., or about four times (×4) that of ABS plastic. A sleeve portion of each end caps is preferably affixed by gluing with two-part polyurethane resin adhesive UR3503 available from the HP Fuller Company. All "O"-ring gaskets are a robust two and ten thousandths inch (0.210") diameter, and are preferably made from neoprene rubber. A retaining ring in each end cap— upon which ring great stress is placed—is preferably constructed of Delrin™ plastic (Delrin™ is a trademark of E. I. DuPont de Nemours and Company). According to these aspects of the housing, (i) the housing is entirely constructed of plastic totally without metal, and (ii) all materials used are "state of the art" circa 1995, and immensely strong and long-lived.

Finally, the housing is strong and durable by design. Although its large parts and gaskets are innately dimensionally stable and substantially immune to tolerance and/or alignment problems, the housing has and presents (i) broad and substantial, durable and substantially incorruptible, mating surfaces that are maintained, and re-maintained, in precision proper alignment primarily by (ii) a large and strong novel retaining ring structure. These aspects of the housing assure that it not only complies with the burst standards of ASTM-D 1785, but that it greatly exceeds (×300%) this standard, registering a burst strength in excess of 600 P.S.I. Moreover, the housing is expected to maintain these properties indefinitely, on an order of many decades, and so long as the reverse osmosis systems and the buildings within which the housing is used exist.

Figure 1:
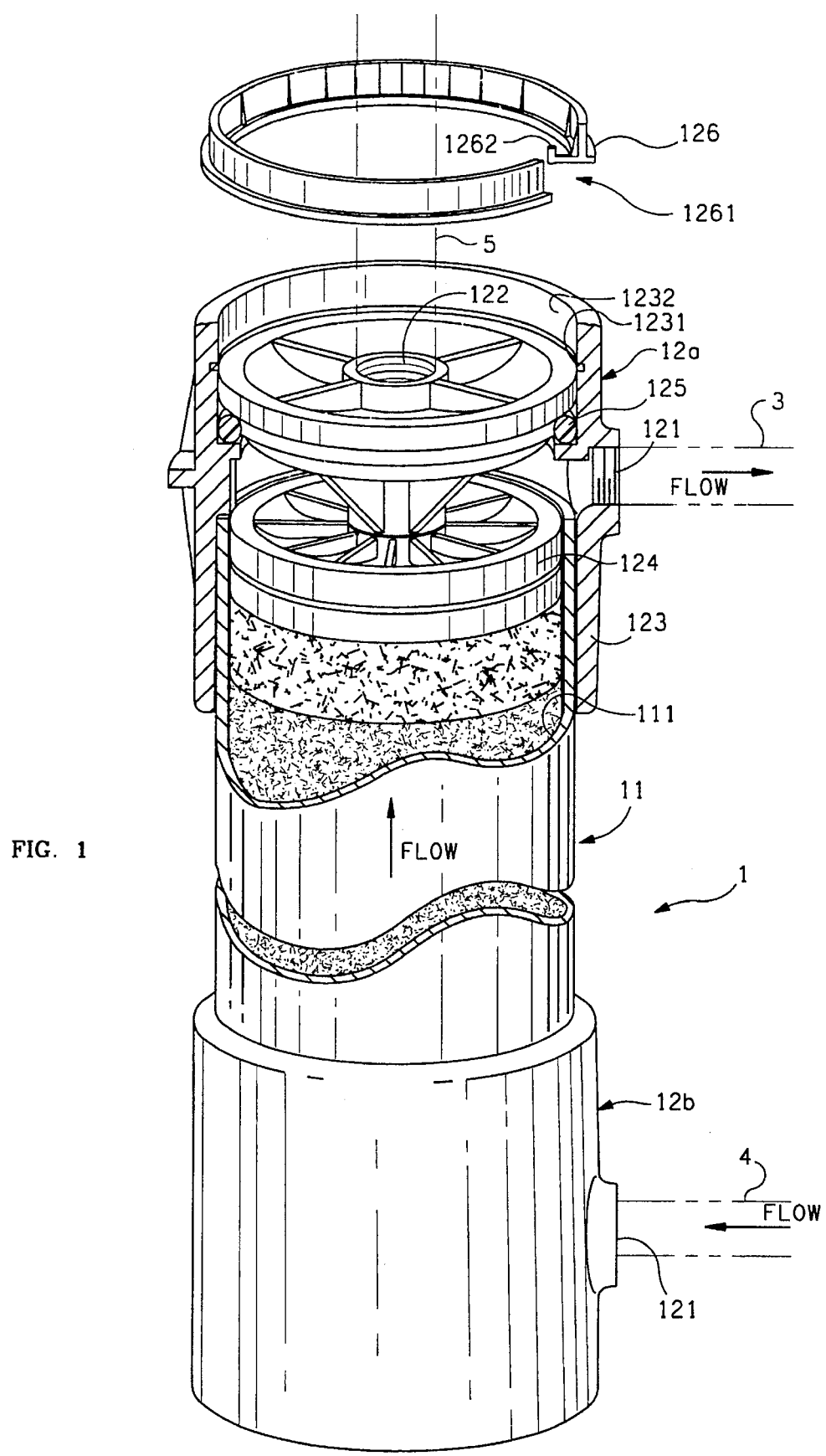
FIG. 1 is a diagrammatic perspective view, partially exploded and partially in cut away, showing the all-plastic hand-assembled assembled super-strength reverse osmosis membrane housing in accordance with the present invention.

A diagrammatic perspective view, partially exploded and partially in cut away, of a preferred embodiment of an all-plastic hand-assembled super-strength reverse osmosis membrane housing 1 in accordance with the present invention is shown in FIG. 1. The housing 1 is cylindrical in shape, with a cylindrical central pipe, or tube, 11 capped at each end by typically two, typically identical (save for an opening of a central outlet bore, to be explained), end caps 12, namely an upper end cap 12a and a lower end cap 12b.

The housing 1 contains an osmosis filter 2 that is not part of the present invention. When the FLOW is in the indicated direction, the housing 1 flow connects at the side port 121 of its lower end cap 12b to a fluid inlet pipe, or hose, 4 (not part of the present invention) though a ½" NPT fitting. Similarly, the housing 1 flow connects at the side port 121 of its upper end cap 12a to a concentrate pipe, or hose, 3 (which is again not part of the present invention) though a ½" NPT fitting.

A feed or concentrate water mixing chamber, best shown in FIG. 1 at the cut-away view of the upper end cap 12a, is presented at the interior of the housing 1 and to the inboard side of the port 121. When the FLOW through the filter 2 is as illustrated, namely from the region of lower end cap 12b to the region of upper end cap 12a, then the chamber is a called feed water mixing chamber when and where located to the interior of lower end cap 12b, and a concentrate water mixing chamber when and where located to the interior of the upper end cap 12a. These two chambers merely promote and ensure that the input fluid is properly distributed to, and the concentrate properly scavenged from, the entire relevant surface of the filter 2.

Finally, the housing 1 flow connects at an axially central port 122, normally at only its upper end cap 12a (as illustrated) to a product outlet pipe, or hose, 5 (not part of the present invention) though a ½" NPT fitting. This product outlet port is optionally located on either end, i.e., within the upper end cap 12a (as illustrated) or, alternatively, within the lower end cap 12b (not illustrated). The central bore, terminating in central port 122, of each end cap 12a, 12b is sealed when the end cap is manufactured. A blockage area (not shown) within the bore is simply drilled out if it is desired to make a product fluid flow connection at, and through, a particular end cap. The housing 1 with its contained filer 2 is normally physically supported only by its the flow connections to pipes 3–5, and is not normally further mounted nor attached.

Each end cap 12 consists of 1) a sleeve 123, 2) a plug 124 having and fictionally attaching 3) an outer "0"-ring gasket 125 and 4) an inner "0" ring gasket (not shown, inside a central bore to the plug 124 opening at its central port 122), and 5) a retaining ring 126. The five pieces of the end cap 12 are all readily assembled and disassembled from each other by hand, and without tools. The sleeve 123 of each end cap 12 is permanently affixed to the central pipe 11, preferably by gluing. (Glue layer not shown in the figures.) The plug 124 and its gaskets are free to slide in and out of the sleeve 123 when not held within the sleeve 123 by the retaining ring 126.

The retaining ring 126 has and presents an opening, or void, 1261 in its circumference. The retaining ring 126 may be compressed in diameter and circumference, particularly by use of the fingers to manually grab and pull on the protuberance 1262, so as to be slipped from position within the interior groove, or channel, 1231 of the sleeve 123 of the end cap 123. An extracted retaining ring 126 may likewise be re-inserted into the groove 1231, retaining the plug 124 in position sealing closed the interior chamber 111 of the pipe 11, and the also central bore 1232 of the sleeve 123 of the end cap 12.

It should now be understood that the chamber, or reservoir, 111 containing the filter 2 is commonly pressurized to a working pressure range of 150–200 P.S.I. If pressurized to the high end of this range, or 200 P.S.I., and if the diameter of the end cap 12 is, as is common, four inches (4"), then the area of plug 124, being approximately twenty-five square inches (25 inches$^2$), incurs a considerable five thousand pounds (5000 lbs.), or two and one-half tons (2½ tons), pressure that attempts to expel the plug 124 from the sleeve 123 of the end cap 12 and of the housing 1. In actuality, the safety margin of the membrane housing is 300%, and pressures up to 600 P.S.I —producing forces on the retaining ring in excess of seven and one-half tons (7½ tons) —may be placed on the plug 124.

The plug 124 is itself solid (save that its central aperture leading to the outlet port 122 be opened), and incurs no problem in withstanding such a pressure force. The retaining ring 126 must, however, be very strong and very effective in order to reliably maintain the plug 124 in the sleeve 123, and in the end cap 12, and in the housing 1 against such a force.

Figure 2:
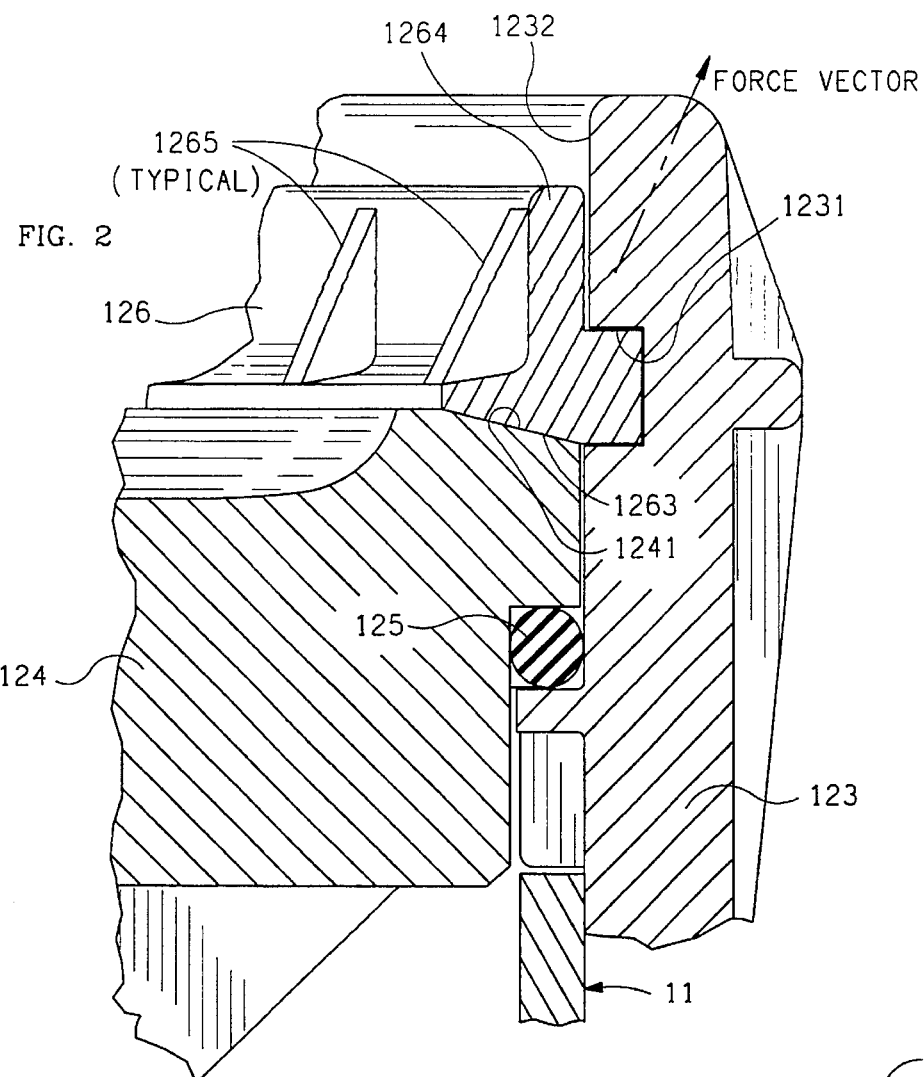
FIG. 2 is a partial side cut-away plan view of the seal, and the retaining ring, of an end cap of the reverse osmosis membrane housing in accordance with the present invention previously seen in FIG. 1.

In order to so function, the retaining ring 126 subtends substantially all of the 360° arc of the central bore to sleeve 123, and its groove 1232. This clearly serves to distribute the forces exerted from the plug 124 through the retaining ring 126 to the sleeve 123 (and to the entire housing 1). Moreover, the mating between the plug 124 and the retaining ring 126 has a special structure, as is best observed in FIG. 2. FIG. 2 shows a partial side cut-away plan view of the "O" ring gasket 125, the retaining ring 126, and the sleeve 123 of an end cap 12 of the preferred embodiment of the reverse osmosis membrane housing 1.

Referring to FIG. 2, the periphery 1241 of the upper surface of the plug 124—which upper surface periphery 1241 is in the shape of an annulus—has and presents a slope, or bevel, that particularly (i) slopes away from the center, or axis, of the plug 124 at (ii) an angle of, preferably, 15° with a range of +15° ,–10°. The opposed, mating, surface 1263 of the retaining ring 126 is of an identical, complimentary, angle. The purpose of the complimentary beveled surfaces is couple force between the pug 124, the retaining ring 126, and the sleeve 123 in the direction of the FORCE VECTOR shown in FIG. 2. This FORCE VECTOR clearly has a radial component that tends to push the expandable retaining ring 126 further, and more forcefully, into the groove 1231 of the sleeve 123. In this manner the retaining ring 126 is not only not subject to loosening, but may effectively not be removed when once, and for so long as, the housing 1 is pressurized.

Figure 3:
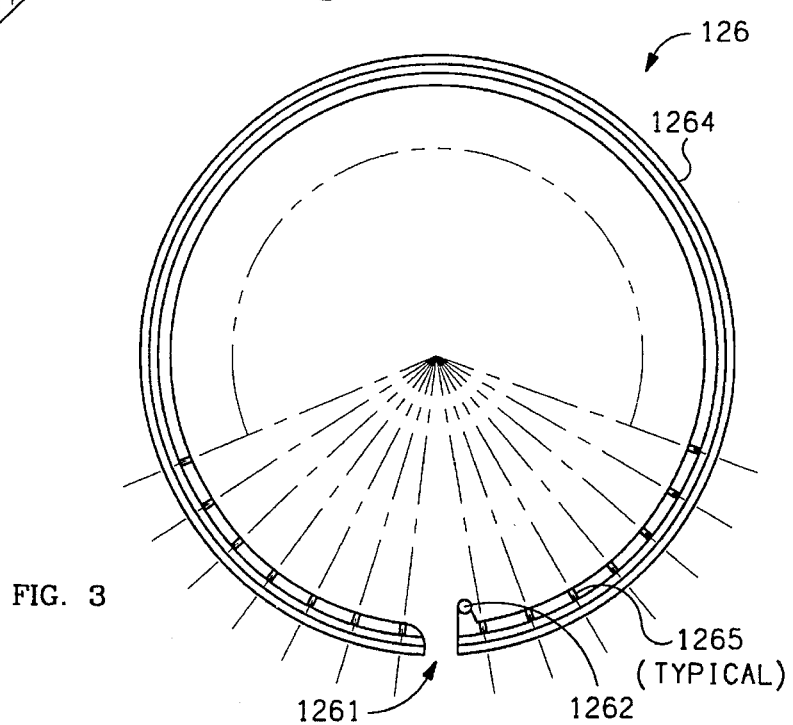
FIG. 3 is a top plan view of the retaining ring of the end cap of the reverse osmosis membrane housing in accordance with the present invention that was previously seen in FIGS. 1 and 2.

The retaining ring 126 must be, and is, immensely strong and essentially shatterproof. It is preferably robustly constructed of Delrin™ plastic. In order that the retaining ring 126 should be accurately held in the main bore 1232 of the sleeve 123, it is preferably constructed with an axially extending flange 1264 that is buttressed by circumferentially arrayed triangular wedges 1265. The buttressed flange 1264, and the entire retaining ring 126, is easily bendable nonetheless to being substantial because it is preferably constructed as a series of interconnected, radially notched, segments as is best seen in FIG. 3. FIG. 3 is a top plan view of the retaining ring 126 of the end cap 12 of the reverse osmosis membrane housing 1, showing both the protuberance 1261, the gap 1262, and the circumferentially arrayed triangular wedges 1265.

The housing 1 is constructed in various sizes as suits its enclosure of various standard osmosis membranes. Sizes, and associated capacities, commonly available include:

| Fits Membrane Size | Product Cap. Gal/Day | Housing Length Available |
| --- | --- | --- |
| 4" × 14" | 450 | 18" |
| 4" × 21" | 900 | 25" |
| 4" × 40" | 2000 | 44" |
| 2 @ 4" × 40" | 4000 | 84" |

The maximum working pressure of the housing 1 is normally 230 P.S.I. The maximum temperature allowance is normally 100° Fahrenheit, with a normal minimum temperature allowance of 34° Fahrenheit. The inside diameter of the housing 1 is nominal 4.0" I.D. The wall thickness of the central cylinder 11 of the housing 1 is commonly 0.260". The material from which the cylinder 11 is constructed is virgin polyvinyl chloride (PVC), type I. The housing 1 may typically be white in color with black end caps 12.

The assembly procedure for the housing 1 is as follows. In step one, cut and machine both ends of an SCD 40, 4.0" PVC pipe (special extrusion). In step two, prepare both ends for a bonding operation. In step three, post machine both end-couplings as required. In step four, post machine both plugs (feed and product end). In step five, apply the special, preferred, glue to both surfaces of end-coupling and the PVC shell. In step 6, assemble both ends. In step seven, install both side seals and plugs. In step eight, install both end Delrin retaining rings.

The circular plug 124 has and presents a central bore that ends in the port 122 shown in FIG. 1. This bore is occluded by an integral stop, in the form of a wall across the bore, that is present in the circular plug 124 when it is made, normally by molding from plastic. This stop in the form of the wall may be drilled out of the bore, the bore tapped, and a pressurized plumbed fluid flow connection through pipe 5 made to the central reservoir through the port 122, and through the central bore of the circular plug 124.

To recapitulate, the main features of the housing 1 so constructed are as follows. The maximum recommended working pressure is 230 PSIG. All inlet and outlet ports are female, ½" NPT. All parts with the exception of the main PVC shell, or pipe 11, are custom injection molded, assuring excellent consistency. Each plug 12 has a double product seal on both ends.

The housing 1 has excellent serviceability compared to conventional housings, the time needed to service the housing being but a fraction of the time needed to service other, prior art, housings. The key component so permitting quick and easy servicing is the especially designed "Delrin" retaining ring which can be installed and removed without use of any tools.

The housing 1 is totally corrosion resistant because all parts are plastic. The end caps 12 have passed over 100,000 cycles pressure testing from 0 PSI to 230 PSI. Destructive testing has shown repeatedly that the bursting pressure is in excess of 600 PSI.

In accordance with the preceding explanation, variations and adaptations of the reverse osmosis membrane housing in accordance with the present invention will suggest themselves to a practitioner of the mechanical and fluid flow design arts. For example, the entire cylindrical body and a modified lower end cap might be molded, at least for shorter versions of the housing, as one unit. In such a case the quick disconnect capability would reside solely in the remaining end cap 12 in accordance with the present invention.

In accordance with these and other possible variations and adaptations of the present invention, the scope of the invention should be determined in accordance with the following claims, only, and not solely in accordance with that embodiment within which the invention has been taught.

What is claimed is:

1. In a membrane housing having a cylindrical central pipe and caps to the pipe ends so as to create a reservoir within the interior of the pipe that is capable of being pressurized, an improvement wherein at least one of the caps comprises:

a cylindrical outer sleeve permanently affixed to a pipe end and extending beyond the pipe end, the sleeve presenting in its extension a circular interior groove;

a circular gasket within the cylindrical sleeve;

a circular plug inserted into the sleeve extension to form a pressure tight seal against the gasket, the circular plug having and presenting at its circular periphery opposite to the seal a bevel surface; and a retaining ring inserted in the circular interior grove of the sleeve and against the plug in a plug position outboard of the reservoir so as to hold the plug in the sleeve, the retaining ring seating upon the bevel surface of the circular plug in a manner that tends, when a pressure force is exerted on the plug such as would tend to eject the plug from the sleeve, to force the retaining ring to greater circumferential distension, and into the circular interior grove of the sleeve into which the retaining ring fits;

wherein pressure in the reservoir tends to hold the retaining ring in its place within the groove.

2. The membrane housing according to claim 1 wherein each of the cylindrical outer sleeve, the circular plug and the retaining ring are plastic.

3. The membrane housing according to claim 1 wherein the retaining ring seated upon the bevel surface has and presents a cylindrical flange extending in parallel with a cylindrical interior surface of the cylindrical sleeve, the flange further tending to stabilize the retaining ring in its place within the groove.

4. The membrane housing according to claim 3 wherein the retaining ring has and presents a small opening by which the ring may be foreshortened in diameter and circumference so as to facilitate insertion into and extraction from the groove; and a feature, located towards the interior of the retaining ring at the location of its opening, suitable to be grasped by the fingers in order that when the retaining ring is located in the grove then it is manually extracted therefrom.

5. A housing for the membrane of a reverse osmosis system comprising:

a cylindrical central pipe having ends;

a sleeve permanently affixed to an end of the pipe and extending beyond the pipe end, the sleeve presenting in its extension a circular interior groove;

a circular plug inserted into the sleeve extension so as to have one circular surface facing outward, and one circular surface facing inward, to the pipe, the circular plug having and presenting at a circular periphery of its outward-facing circular surface a bevel surface; and a retaining ring, having a bevel surface that is complimentary to the bevel surface of the plug, inserted in the circular interior grove of the sleeve and seating, bevel surface to bevel surface, against the plug so as to hold the plug in the sleeve., the seating tending, when any force is exerted on the plug as would tend to expel the plug outward from its held position within the sleeve, to force the retaining ring to greater circumferential distension, and tightly into the circular interior grove of the sleeve into which the retaining ring fits.

6. A manual method of removing an old membrane filter and inserting a new membrane filter within a pressurized membrane housing of a reverse osmosis system, the method comprising:

de-pressurizing a reservoir, defined by a cylindrical central pipe and caps to the pipe ends, containing the old membrane filter;

foreshortening by force of the fingers a retaining ring, located in a circular interior groove of an end cap, that has and presents (i) a peripheral bevel, and a small opening by which the ring may be so foreshortened in diameter and circumference, and extracting the retaining ring from the groove;

extracting a circular plug, also having a peripheral bevel, from the end cap so as to obtain access to the interior of the cylindrical central pipe;

removing the old membrane filter, now exposed by extraction of the beveled circular plug, from its position within the interior of the cylindrical central pipe;

inserting a new membrane filter into position within the interior of the cylindrical central pipe;

replacing the beveled circular plug within the end cap so that its peripheral bevel is outward facing;

replacing the foreshortened retaining ring into the circular interior groove of the end cap so that its peripheral bevel contacts against the peripheral bevel of the circular plug, permitting the retaining ring to expand once in position within the groove; and re-pressurizing the reservoir, now containing the new membrane filter., so that the circular plug to the reservoir is forced outward against the retaining ring in a manner that, by operation of the contacting bevels of the plug and of the retaining ring, forces the retaining ring so tightly within the groove that it can no longer be foreshortened and extracted by force of the fingers;

wherein the membrane filter is manually replaceable within the membrane housing of a reverse osmosis system, but only when the membrane housing is depressurized.

7. A method of making a membrane housing of a reverse osmosis system, the method comprising:

cut and machine both ends of a plastic pipe suitable to define a cylindrical reservoir holding an osmosis membrane;

prepare both cut and machined pipe ends for bonding;

bond a cylindrical sleeve having an internal circumferential groove to each pipe end so that a portion of the cylindrical sleeve including its internal circumferential groove extends beyond each pipe end;

prepare plugs suitable to fit within the cylindrical sleeve at each pipe end, each plug having and presenting a peripheral bevel surface, and insert a beveled plug within the cylindrical sleeve at each pipe end;

install a retaining ring, the retaining ring having and presenting a peripheral bevel surface that is complimentary to the bevel surface of the beveled plug, within the cylindrical sleeve at each pipe end so as to fit against the plug, bevel surface to bevel surface, and so as to retain the plug within the cylindrical sleeve;

wherein the bevel surface of the plug forces against the bevel surface of retaining ring in a manner that tends, when any force tend to eject the plug from the sleeve is exerted on the plug, to force the retaining ring to greater circumferential distension, and tightly into the circular interior grove of the cylindrical sleeve into which the retaining ring fits.

8. A housing for the membrane of a reverse osmosis system comprising:

a cylindrical member suitable to receive the membrane of a reverse osmosis system, the cylindrical member having and presenting ends and also a circular interior groove near at least one end;

a circular plug, having opposed circular surfaces, inserted into at least that one end of the cylindrical member near to which end is presented the interior circular groove so as to have one of its circular surfaces facing outward from, and the other one of its circular surfaces facing inward to, the cylindrical member, the circular plug having and presenting at a circular periphery of its outward-facing circular surface a bevel; and a retaining ring, having a bevel that is complimentary to the bevel of the plug, inserted in the circular interior grove of the cylindrical member and seating, bevel to bevel, against the plug so as to hold the plug in the cylindrical member;

wherein the seating, plug bevel to retaining ring bevel, tends, when any force is exerted on the plug as would tend to expel the plug outward from its held position within the cylindrical member, to force the retaining ring to greater circumferential distension, and tightly into the circular interior grove of the cylindrical member into which the retaining ring fits.

* * * * *